J. R. DOSTAL.
FRUIT AND VEGETABLE PULPING MACHINE.
APPLICATION FILED DEC. 5, 1918.

1,343,439.

Patented June 15, 1920.
2 SHEETS—SHEET 1.

WITNESSES:

INVENTOR
John R. Dostal
By
ATTORNEYS

J. R. DOSTAL.
FRUIT AND VEGETABLE PULPING MACHINE.
APPLICATION FILED DEC. 5, 1918.

1,343,439.

Patented June 15, 1920.
2 SHEETS—SHEET 2.

WITNESSES:

INVENTOR
John R. Dostal
By Young & Young
ATTORNEYS

UNITED STATES PATENT OFFICE.

JOHN R. DOSTAL, OF MILWAUKEE, WISCONSIN, ASSIGNOR TO HENRY SCARBOROUGH, OF MILWAUKEE, WISCONSIN.

FRUIT AND VEGETABLE PULPING MACHINE.

1,343,439.  Specification of Letters Patent.  Patented June 15, 1920.

Application filed December 5, 1918. Serial No. 265,369.

*To all whom it may concern:*

Be it known that I, JOHN R. DOSTAL, a citizen of the United States, and resident of Milwaukee, in the county of Milwaukee and State of Wisconsin, have invented certain new and useful Improvements in Fruit and Vegetable Pulping Machines; and I do hereby declare that the following is a full, clear, and exact description thereof.

My invention relates to new and useful improvements in fruit and vegetable pulping machines, more particularly of that type embodied in co-pending application for patent filed February 21, 1917, Serial No. 149,991 and comprising a crushing mechanism rotatable with and adapted to feed the crushed fruit or other work material to a centrifugal separator mechanism which acts to separate the pulp and juice of the work material from the stems, seeds and skins or other refuse portions.

It is in general the object of my invention to simplify and otherwise improve the structure and to increase the efficiency of machines of this character particularly with respect to the volume of output.

More particularly, it is an important object of my invention to facilitate the feeding movement of the pulp from the grinding mechanism to the centrifugal separating mechanism, which in the present instance embodies a foraminous drum into which the material is fed, and whereby to avoid the tendency of the material to choke at the entrance to the foraminous drum by reason of the radial momentum imparted to the material by the rotative action of the grinding mechanism.

A further object resides in the provision of an improved arrangement for procuring a positive feed of the work material through the foraminous drum.

A still further object resides in the provision of an improved arrangement for brushing the drum incidental to the rotative movement of the work material therein.

A still further object resides in the provision of an improved arrangement for procuring a most ready discharge of both the pulp and juice and the refuse from the machine.

With the above and other objects and advantages in view, which will be apparent as the description proceeds, my invention resides in the novel features of construction, combination and arrangement of parts as hereinafter more particularly described and defined by the appended claims.

Figure 1:
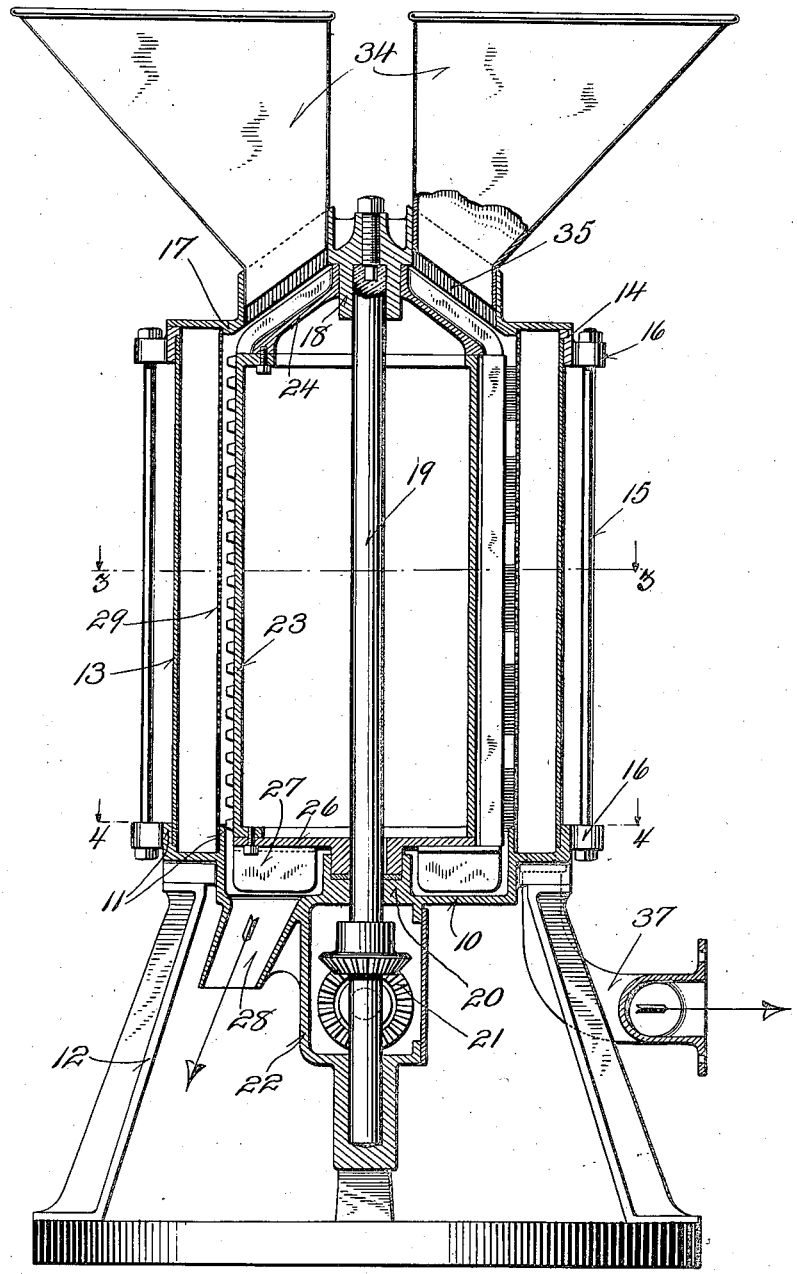
Figure 1 is a vertical sectional view taken centrally through a pulping machine embodying my invention.
Figure 2:
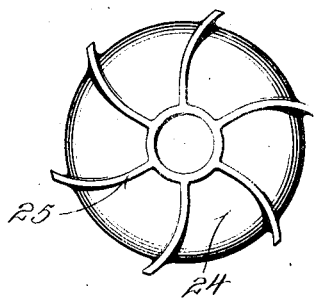
Fig. 2 is a top view of the rotative grinding and feeding drum.
Figure 3:
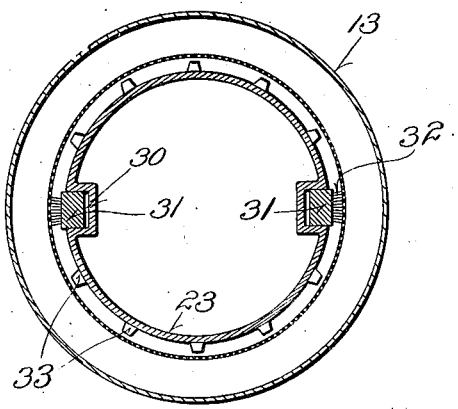
Fig. 3 is a transverse sectional view through the machine on the line 3—3 of Fig. 1.
Figure 4:
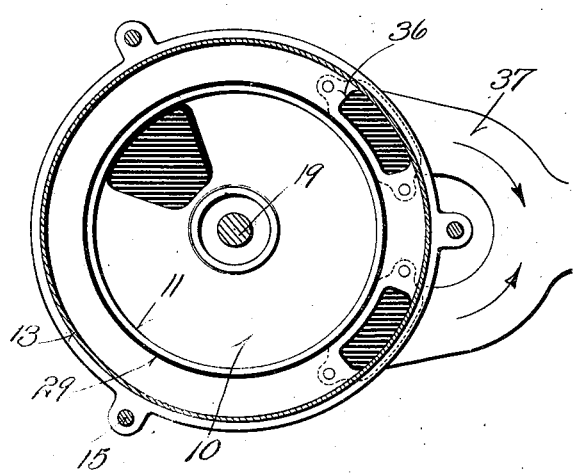
Fig. 4 is a transverse sectional view through the machine on the line 4—4 of Fig. 1.
Figure 5:
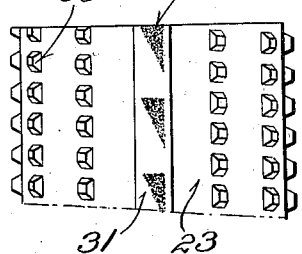
Fig. 5 is an elevational view of a portion of the rotative grinding and feeding drum.

Referring now more particularly to the accompanying drawings, my improved machine comprises a pan-shaped base member 10 preferably formed of a single casting and having an out-turned marginal portion on which is formed concentric flanges 11 forming an annular channelway for the pulp and juice expressed in the operation of the machine, this base member being supported on suitable legs 12. The lower portion of a cylindrical casing wall 13 is fitted within the outer flange 11 of the base member, and is engaged at its upper end in a head annulus 14 which is connected with the base member by tie bolts 15 passed through outstanding lugs 16 on said annulus and the base member. A head member 17 seats on the casing annulus 14, and is conical in shape, having a flat marginal portion. A bearing annulus 18 depends from the apex of this head member and a shaft 19 has its upper end journaled in this annulus, and its lower end journaled in a bearing enlargement 20 of the base member 10, this shaft being driven by any suitable gear connection 21 housed within a casing 22 depending from the base member 10. This shaft serves to rotate a combined feeding and crushing member comprising in the present instance a vertically disposed elongated drum including a cylindrical wall 23 surrounding the shaft and closed at its upper end by a conical grinding head 24 which has its apex portion surrounding and bearing against the annulus 18 of the head member. This grinding head as shown particularly in Fig. 2 is provided with grinder blades 25 on its conical surface extending radially from its center, with their outer end portions curved rearwardly with respect to the direction of rotation of the drum whereby to facilitate the discharge of crushed work material from said conical grinding head. The lower end of the drum is closed by a bottom head plate 26 keyed to the shaft 19 and this plate carries depending radial blades 27 adapted to sweep the material in the pan-shaped base member 10 to a discharge spout 28 in the bottom of said member. A cylinder 29 surrounds the drum, said cylinder fitting about the inner flange 11 of the base member at its lower end and having its upper end held by the head member 17. This cylinder is foraminous in nature from its upper end to a point adjacent its lower end, the lower portion of the cylinder thus forming a dam wall preventing flow of material into the pan-shaped portion of the base member 10 from the lower portion of the annular chamber defined by the outer casing cylinder 13 and the cylinder 29. Diametrically opposed portions of the drum wall are inset to provide channels 30 extending longitudinally throughout the wall, and brush head bars 31 are loosely disposed in said channels whereby they may move outward under centrifugal force when the drum is rotated. Each of these bars carries brush sections 32 disposed in spaced relation, and the brush sections of the bars are relatively staggered as shown particularly in Fig. 5. The forward side of each brush section, with respect to the direction of rotation of the drum is beveled downwardly and rearwardly to thus exert a downward sweeping action upon rotation of the drum. The drum also carries series of outward projections 33 which extend to a very short distance from the inner peripheral surface of the screen cylinder 29, and these projections are arranged in vertical rows and more particularly in continuous helical convolutions about the periphery of the drum, the pitch of the spiral being comparatively slight whereby the entire surface of the screen cylinder is swept by these projections, the vertical spaces between the projections providing clearances to prevent clogging of material while the horizontal spaces between the projections define pockets or channels or recesses in which the work material lodges to receive rotative impulse from the drum, in conjunction with the rotative impulses transmitted by the brushes 32 which also serve to keep the interstices of the screen cylinder 29 clear. The brush sections are preferably formed of ordinary bristles and also of whalebone bristles to prevent collapse of the other bristles under centrifugal force.

Hoppers 34 are carried by the head member 17 and discharge onto the grinding drum head 24 through openings 35 in said head member. Thus may be procured a continuous feed of fruit or vegetable or other work material to the grinding drum head 24 and from thence by centrifugal action to the annular space between the drum wall 23 and the screen cylinder 29, the material being gradually fed down through said space and separated by centrifugal action, the pulp and juice passing through the screen cylinder while the refuse, seeds, skins and the like, passes into the pan-shaped base member and out through the spout 28. The expressed pulp and juice pass from the machine through bottom openings 36 in the marginal portion of the base member 10 and through branches of a discharge manifold 37.

By the conical shape of the grinder head, a maximum expanse of grinding surface is procured, and at the same time a further important advantage is effected in that the slant of the grinding surface procures a downward direction of movement of the crushed work material, thus facilitating the passage of the work material into the annular space between the drum 23 and the foraminous cylinder 29 in the present embodiment of my invention.

What is claimed is:

1. A machine of the class described including a separating member, a conical crushing member, means for rotating the crushing member, and means extending from and rotatable with the crushing member to move material in juxtaposition to the separating member.

2. A machine of the class described including a separating member, a conical crushing member disposed above the separating member, means for feeding work material to the crushing member, means for rotating the crushing member, and means extending from the periphery of the crushing member and rotatable with said crushing member for moving material in juxtaposition to the separating member.

3. A machine of the class described including a separating member, a conical crushing member, means extending from and rotatable with the crushing member to move material in juxtaposition to the separating member, and a conical head member disposed over the crushing member and apertured to permit passage of work material therethrough.

4. A machine of the class described including an annular foraminous separating member, a conical crushing member disposed inwardly of the inner periphery of the foraminous separating member, means for feeding work material to the crushing member, means for rotating the crushing member to crush said work material and discharge it to the separating member, and means for moving work material past the foraminous separating member.

5. A machine of the class described including an annular foraminous separating member, a conical crushing member disposed inwardly of the inner periphery of the foraminous separating member, means for feeding work material to the crushing member, means for rotating the crushing member to crush said work material and discharge it to the separating member, and means rotatable with and receiving material from the crushing member for moving material in juxtaposition to the separating member.

6. A machine of the class described including an upstanding drum, means for rotating the drum, a conical grinding head carried on the drum, a conical head member disposed over the grinding head and apertured to permit passage of work material therethrough, a foraminous cylinder surrounding the drum, and means carried by the drum for bodily rotating work material in the space between the drum and cylinder whereby to express portions of the work material through the cylinder by centrifugal action.

7. A machine of the class described including a rotating drum, a foraminous cylinder surrounding the drum, means for feeding work material between the drum and cylinder, and longitudinal series of brush members carried by the drum and movable radially outward therefrom to engage the cylinder upon rotation of the drum, the forward sides of said brush members with respect to the direction of rotation of the drum being beveled whereby to feed work material along the periphery of the drum.

8. A machine of the class described including a rotating drum, a foraminous cylinder surrounding the drum, said drum being provided with longitudinal channels in its periphery, brush bars mounted in said channels and movable radially outwardly therefrom, brush sections carried by said bars and engageable with the cylinder, and means for feeding work material between the drum and cylinder.

9. A machine of the class described including a rotating drum, a foraminous cylinder surrounding the drum, and provided with longitudinal channels in its periphery, brush bars mounted in said channels and movable radially outwardly therefrom, series of spaced brush sections carried by said bars and engageable with the cylinder, the brush sections of the bars being relatively staggered, and means for feeding work material between the drum and cylinder.

In testimony that I claim the foregoing I have hereunto set my hand at Milwaukee, in the county of Milwaukee and State of Wisconsin.

JOHN R. DOSTAL.